(12) United States Patent
Huck et al.

(10) Patent No.: US 11,815,374 B2
(45) Date of Patent: Nov. 14, 2023

(54) FLOW METER FOR A FLUID WITH A PULSATING FLOW

(71) Applicants: Ralf Huck, Großkrotzenburg (DE); Jürgen Kiefer, Bruchsal (DE)

(72) Inventors: Ralf Huck, Großkrotzenburg (DE); Jürgen Kiefer, Bruchsal (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 16/787,822

(22) Filed: Feb. 11, 2020

(65) Prior Publication Data
US 2020/0256712 A1 Aug. 13, 2020

(30) Foreign Application Priority Data
Feb. 12, 2019 (DE) .............................. 10201920181.3

(51) Int. Cl.
*G01F 15/02* (2006.01)
*G01F 1/20* (2006.01)

(52) U.S. Cl.
CPC .............. *G01F 1/20* (2013.01); *G01F 15/022* (2013.01)

(58) Field of Classification Search
CPC . G01F 23/603; G01F 1/72; G01F 3/20; G01F 15/022; G01F 1/20
USPC ...................................................... 73/861.02
See application file for complete search history.

(56) References Cited

U.S. PATENT DOCUMENTS

| | | | |
|---|---|---|---|
| 3,370,463 A * | 2/1968 | Chanaud | G01F 1/78 73/861.34 |
| 3,729,995 A | 5/1973 | Kovacs et al. | |
| 4,976,155 A | 12/1990 | Challandes | |
| 6,170,338 B1 * | 1/2001 | Kleven | G01F 1/3254 73/861.22 |

(Continued)

FOREIGN PATENT DOCUMENTS

| | | |
|---|---|---|
| CN | 102016735 | 4/2011 |
| CN | 102741665 | 10/2012 |

(Continued)

OTHER PUBLICATIONS

English translation of DE4029616 specification from worldwide.espacenet.com.*

(Continued)

*Primary Examiner* — Kristina M Deherrera
*Assistant Examiner* — Jean F Morello
(74) *Attorney, Agent, or Firm* — Cozen O'Connor

(57) ABSTRACT

A flow meter for a fluid with a pulsating flow includes a piezo transducer for receiving and converting fluid pulses into electrical pulses, a AC/DC converter circuit for cumulatively storing the pulse energies of the electrical pulses in an energy store, a counter for counting the electrical pulses during a time interval, an evaluation device for determining a pulse parameter indicative of the flow rate of at least one of the electrical pulses and for determining a flow value based on the electrical pulses counted within the time interval and the determined pulse parameter, a communication device for the preferably wireless transmission of the determined flow value and a power supply device for the exclusive power supply of the flow meter with the energy stored in the energy store.

11 Claims, 2 Drawing Sheets

(56) References Cited

U.S. PATENT DOCUMENTS

| | | | |
|---|---|---|---|
| 6,588,269 | B1 | 7/2003 | Benghezal et al. |
| 2006/0137447 | A1 | 6/2006 | Usui et al. |
| 2009/0260438 | A1 | 10/2009 | Hedtke |
| 2010/0109331 | A1* | 5/2010 | Hedtke .............. G05B 23/0256 290/54 |
| 2011/0137580 | A1* | 6/2011 | Bartels ..................... G01F 3/20 702/47 |
| 2011/0162460 | A1 | 7/2011 | Allen et al. |
| 2011/0214762 | A1 | 9/2011 | Sanderson et al. |
| 2011/0263212 | A1* | 10/2011 | Yeh ....................... H04W 28/22 455/73 |
| 2015/0323356 | A1* | 11/2015 | Brosnihan ................. G01F 1/86 73/861.24 |

FOREIGN PATENT DOCUMENTS

| | | |
|---|---|---|
| CN | 104215307 | 12/2014 |
| CN | 105450079 | 3/2016 |
| CN | 107121165 | 9/2017 |
| CN | 207263238 U | 4/2018 |
| DE | 4029616 | 3/1992 |
| EP | 0391954 | 10/1990 |
| EP | 0763368 A2 | 3/1997 |
| EP | 1985974 A2 | 10/2008 |
| JP | H04323520 | 11/1992 |
| TW | 200631804 | 9/2006 |
| WO | 2010029372 | 3/2010 |

OTHER PUBLICATIONS

Office Action dated Aug. 4, 2021 issued in the corresponding Chinese Patent Application No. 202010086532.7.

Su et al. "The Application of Vibration measurement Technology in the Vortex Flowmeter", pp. 48-49, Feb. 25, 2016.

Li et al. "Low-power Hardware Design of the Vortex Flowmeter", Journal of Chongqing University of Arts and Sciences (Natural Science Edition), pp. 33-36, Aug. 10, 2012.

Ji et al. "Design of Vibration Active Control Valve of the Hydraulic Pipeline Pulsation", Machinery Design & Manufacture, pp. 84-87, Sep. 8, 2017.

* cited by examiner

FLOW METER FOR A FLUID WITH A PULSATING FLOW

BACKGROUND OF THE INVENTION

1. Field of the Invention

The invention relates to a flow meter for a fluid (flow medium) with a pulsating flow, and to a pressure-sustaining valve which contains such a flow meter.

2. Description of the Related Art

The direct flow measurement of pulsating flows is often faulty, and therefore, in many cases, measures for damping or extinguishing the pulsations are provided. Such measures, such as the installation of throttle valves and expansion tanks in the fluid line, are complex and can also be undesirable if, for example, the pulsation of the fluid serves to avoid deposits in the line system.

Most pumps produce pulsating flows to a greater or lesser extent. This particularly applies to metering pumps that are used in process technology for conveying and precisely metering free-flowing substances in a wide pressure and volume flow range, for example, from a few milliliters in the laboratory up to tens of thousands of liters per hour.

The metering pumps are, as a rule, oscillating positive displacement pumps in which a displacer, such as a piston or a diaphragm, alternately enlarges and reduces a working chamber. During the suction stroke of the displacer, a defined volume of a free-flowing substance, as a rule a liquid, is sucked into the working chamber via an intake valve and is pressed into a pressure or metering line to a consumption point during the pressure stroke via a pressure valve. In the event that there is not enough counter-pressure for the metering pump on the pressure side, the latter can be produced via a pressure-sustaining valve within the metering line. The displacer can be driven in different ways, for example, via an electromagnet, a motor, compressed air (pneumatically) or hydraulically. Hydraulic drives, such as hydraulically hinged diaphragm pumps (piston-diaphragm pumps), are used, in particular when there is a need to pump against high pressures.

In many types of metering pumps, in particular in piston metering pumps, the delivery flow is hardly dependent on the delivery pressure, and there is a linear dependence of the delivery flow on the stroke length and stroke frequency. In the case of diaphragm metering pumps, on the other hand, the delivery flow is dependent on the counter-pressure because of the elastic metering diaphragm. This applies, for example, also to pumps with a pneumatic drive or if the liquid to be conveyed contains gas bubbles.

DE 40 29 616 C2 discloses a way to detect the periodic pressure fluctuations of a flow medium directly in the outlet region of a metering pump or in the outlet-side line system via a pressure-measuring device containing a piezoelectric sensor. The pressure measuring device is connected to a control device that serves to control the pump and contains a counting device for counting the detected pulses or pump strokes and a computer that determines the delivery quantity of the pump via the detected pulse number or pump strokes and based on the delivery quantity per pump stroke. It is obviously assumed here that the pump strokes are constant, but this is not given, for example, in metering pumps with an adjustable stroke length and in diaphragm metering pumps because of the elasticity of the metering diaphragm. The determined delivery rate is therefore comparatively inaccurate.

SUMMARY OF THE INVENTION

In view of the foregoing, it is an object of the invention is to enable energy-independent and accurate flow measurements of pulsating flows.

This and objects and advantages are achieved in accordance with the invention by a flow meter and a pressure-sustaining valve containing such a flow meter.

In accordance with the invention, a flow meter for a fluid with a pulsating flow includes a piezo transducer for receiving and converting fluid pulses into electrical pulses, an AC/DC converter circuit for cumulatively storing the pulse energies of the electrical pulses in an energy store, a counter for counting the electrical pulses during a time interval, an evaluation device for determining a pulse parameter indicative of the flow rate of at least one of the electrical pulses and for determining a flow value based on the electrical pulses counted within the time interval and the determined pulse parameter, a communication device for sending the determined flow value and a power supply device for the exclusive power supply of the flow meter with the energy stored in the energy store.

It is also an object of the invention to provide a pressure-sustaining valve that contains such a flow meter, where the piezo transducer is connected to a closing body of the pressure holding valve.

The flow meter in accordance with the invention is therefore supplied independently from the kinetic energy of the fluid pulses converted into electrical energy via the piezo converter. The flow measurement is based not only on the number of fluid pulses or pump strokes detected, but also on the amount of fluid moved with each fluid pulse or pump stroke, which is represented by or is correlated with the energy of the fluid pulses.

The term fluid pulses is to be understood as meaning pressure and/or flow pulses of the fluid. Thus, for example, the piezo transducer can be arranged in the flow on a movable element, such as a flexural resonator, where the element with the piezo transducer is deflected in different directions by the flow fluctuations. Preferably, the piezo transducer is arranged outside the flowing fluid for receiving pressure pulses. For this purpose, the piezo transducer can be connected, for example, directly or via a force transmission element to a membrane inside a pressure cell, which membrane separates the piezo transducer from the fluid and is elastically deflected by the pressure pulses. In principle, the piezo transducer can be arranged on each element or component that is moved by the pressure or flow pulses of the fluid, that is, for example, on the closing body of a pressure-sustaining valve that lies behind a pump in the course of the pressure line and serves to generate a counter-pressure. In this example, the piezo transducer is therefore advantageously integrated in a component, here the pressure-sustaining valve, which in many cases is required anyway for accurate metering.

The flow meter in accordance with the invention is configured to count the fluid pulses or the electrical pulses generated by the piezo transducer in a first phase in a time interval and at the same time to accumulate and store the energy of the individual pulses. A plurality of different AC/DC converter circuits is known from the literature for effectively storing electrical energy generated from kinetic energy by means of a piezo transducer in an energy store. In most cases, this is a rectifier circuit with a downstream boost converter (step-up converter). Passive voltage multiplier circuits are also known for this purpose. Suitable energy stores are, in particular, a capacitor or a rechargeable battery. It is also possible to first charge the capacitor and recharge the battery from it.

The energy required to count the pulses and the AC/DC conversion is minimal and significantly less than the energy collected in the first phase so that the counter and the AC/DC converter may be permanently (i.e., simultaneously) active in the first phase.

In a second phase, the evaluation device determines a flow value of the fluid based on the pulses counted within the previous time interval and a pulse parameter indicative of the flow rate of at least one of the electrical pulses. This flow value can advantageously be transmitted wirelessly, for example, optically (infrared) or preferably via radio (WLAN, Bluetooth), to a receiver. The evaluation device and the communication device require more energy for their functions than the counter and the AC/DC converter circuit. As a result, they are preferably active only in the second phase and are then independently supplied with the stored energy from the energy store. In principle, a line-bound transmission of the determined flow values is in principle also possible, but the flow meter could then also be supplied with the required energy via the line in the case of fixed wiring. It is also possible to provide the flow meter in accordance with the invention in the form of a data logger in which, for example, the user retrieves a totalizer value via a serial interface.

The second phase is again followed by the first phase in which the energy store is charged and the electrical pulses during a time interval are counted without any appreciable energy being taken by the evaluation device and the communication device.

The time interval in which the pulses are counted can be set in different ways. Thus, the time interval can be pre-defined in a fixed manner, so that the counter reading reached at its end is variable. In the simplest case, the time interval is variable and its end is determined by the time at which the counter reaches a predetermined counter reading which, naturally, also includes the possibility that the counter counts down from the predetermined counter reading. After the time interval has elapsed, the counter can activate the evaluation device for determining the flow value and the communication device for sending this flow value, where the communication device can also be activated by the evaluation device. The determined flow values can each be sent immediately or alternatively at different times, and in the latter case they can be provided with a respective current time stamp at the time of their determination. The time for the transmission of the flow values can then be made dependent, for example, solely on the energy available in the energy store.

The power supply device can have a measuring device for measuring the energy currently stored in the energy store and can be configured to deactivate the evaluation device and/or communication device or to prevent it from being activated by the counter as long as the stored energy falls below the predetermined threshold value. Thus, the counter can be reset and a new time interval for counting the pulses can be started if, on expiry of the current time interval, the available energy is insufficient for determining and subsequently transmitting the flow value. This process can be repeated, or the first phase can be extended until the energy stored in the energy store exceeds the predetermined threshold value when the time interval or the predetermined counter reading is reached.

As already mentioned, the determination of the flow value is also based on a pulse parameter indicative of the flow rate of at least one of the counted electrical pulses. The energy input of one or more electrical pulses into the energy store can be used as a flow-relevant pulse parameter. Here, for example, the energy input of all counted electrical pulses corresponds to the energy accumulated in the energy store within the time interval. In the case of an energy store in the form of a capacitor with a known capacitance, this energy increase can be determined directly by measuring the voltage increase at the capacitor between the beginning and the end of the time interval. As already mentioned above, the capacitor can be recharged, for example, via a DC-DC converter, into a rechargeable battery or another energy store. If this is done before the start of each new time interval for counting the pulses, then the capacitor can be placed in the same defined charge state at the beginning of each time interval, so that a voltage measurement is only required at the end of the time interval and if at the same time the energy stored in the battery is sufficient to operate the evaluation device. The voltage measurement can be performed by the activated evaluation device.

As an alternative to determining the energy input of the electrical pulses into the energy store, the duration, height and/or area of the at least one electrical pulse can be determined as a flow-relevant pulse parameter. If the time interval in which the fluid pulses or pump strokes are counted is sufficiently short, so that the flow can be assumed to be constant within this time interval, it is sufficient to determine the pulse parameter of only one or fewer electrical pulses representative of all counted pulses.

There is also the possibility of determining the flow-relevant pulse parameters in the time interval while the individual electrical pulses are being counted. A prerequisite for this is merely that sufficient energy is available for the evaluation device in the energy store. As a rule, this is the case when measurement breaks are allowed or specified that only served to charge the energy store with the electrical pulses generated from the fluid pulses. It is also possible to dispense with measurement breaks between the time intervals and to count only the electrical pulses in a first part of the time interval and in the second part to count the electrical pulses and to determine their pulse parameters.

In many cases, the flow rate of the pulsating fluid can be determined only indirectly from the number of fluid pulses or pump strokes and the pulse parameters of the electrical pulses representing the energies of the fluid pulses because unknown factors, such as aging processes of the energy store, temperature dependencies and counter-pressure in the fluid system impair the accuracy of the measurement. In an embodiment of the invention, further measurements are implemented in the second phase (but not necessarily in every second phase) in order to regularly determine correction values. For this purpose, the pressure meter in accordance with the invention can have one or more sensors for detecting a measurement variable that is relevant for the flow of the fluid, such as temperature or pressure. The indirectly measured flow rate of the last cycle or the following cycles can be corrected with the aid of the correction values. The intervals between the additional measurements are preferably only a few minutes or hours, so that no appreciable aging, process pressure or temperature change need be assumed in this time. The corrected flow values are thus always sufficiently accurate and, in addition, still detect the flow in a continuous manner.

The need for correction is eliminated in an advantageous manner if the piezo transducer is coupled to the closing body of a pressure-sustaining valve and detects the movement of the closing body. The closing body of the pressure-sustaining valve is only moved out of the closed position when the fluid actually flows during the pressure stroke of the pump that is pumping, where the opening (opening amount) of the pressure-sustaining valve is proportional to the pressure of the fluid or to the pressure stroke of the pump. The valve stroke and opening duration of the pressure-sustaining valve thus exactly reflect the metering quantity of the fluid, which is why gas bubbles in the fluid, leaks in the pressure line, changes in the metering stroke by adjusting the stroke length or changing counter-pressure on the side of the pressure-sustaining valve facing away from the pump have no influence on the accuracy of further measurement. The pressure-sustaining valve is normally configured so that it opens completely as far as the stop during the pressure stroke of the pump. Consequently, the opening duration of the pressure-sustaining valve is directly proportional to the dosing quantity of the fluid, so that the determination of the opening duration is sufficient to determine the flow. In the absence of the normal case, the opening stroke of the closing body can also be determined in addition to the opening duration. The opening duration and opening stroke together produce the opening amount and are determined on the basis of the duration and the height (peak) of the electrical pulse.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained hereinafter using exemplary embodiments and with reference to the figures of the diagram, in which.

DETAILED DESCRIPTION OF THE EXEMPLARY EMBODIMENTS

Figure 1:
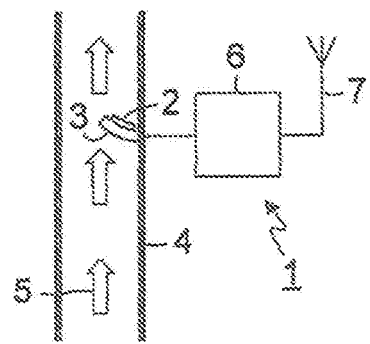
FIG. 1 is a schematic illustration of flow meter in accordance with the invention with a piezo transducer for detecting flow pulses in a fluid with a pulsating flow.

The illustrations in the figures are diagrammatic and not to scale. Identical or similar components in different figures are provided with the same reference characters.

The invention is not limited in its embodiments to the preferred embodiments shown in the figures. On the contrary, a plurality of variants is conceivable which, in the solution shown, make use of the basic idea of the invention even in the case of embodiments of fundamentally different types.

FIG. 1 shows a first example of the flow meter 1 in accordance with the invention with a piezo transducer 2 that is arranged on a movable element 3, here, for example, in the form of a flexural vibrator, in a fluid line 4 through which a fluid or flow medium 5 flows with pulsating flow. The piezo transducer 2 is connected to an electronic system 6, which is explained in more detail below with reference to FIGS. 5 and 6 and is configured to determine the flow rate of the fluid 5 from the flow pulses detected by the piezo transducer 2 and to send the flow measurement values obtained in the process via a radio connection (antenna 7) to a receiver (not shown here), for example, a controller for a pump conveying the fluid or a control system of an industrial installation containing the fluid line 4. Communication can be performed, for example, according to the Bluetooth standard, a Near Field Communication (NFC) standard, a WLAN standard or a mobile radio standard. It is, of course, also possible to wirelessly transmit the pressure measured values in a different manner, such as via an infrared interface. The electronic system 6 is furthermore configured for the self-supply of the flow meter 1 from the energy of the detected flow pulses.

Figure 2:
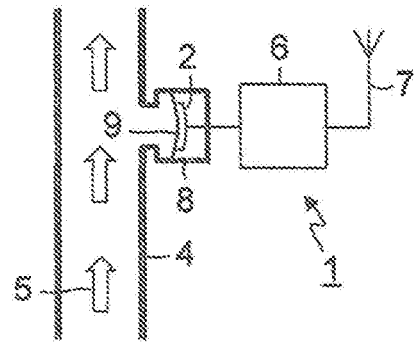
FIG. 2 is a schematic illustration of flow meter in accordance with the invention, in which the piezo transducer is a component of a pressure meter for detecting pressure pulses in the fluid.

FIG. 2 shows a further exemplary embodiment of the flow meter 1 in accordance with the invention, in which the piezo transducer 2 is a component of a pressure gauge 8 that detects the pressure pulses generated by the fluid 5 flowing in a pulsating manner. The pressure gauge 8 is established in the form of a load cell that is connected to the fluid line 4 and the interior of which is sealed off from the fluid 5 by a flexible membrane 9. The pressure pulses in the fluid line 4 lead to deflections or deformations of the membrane 9 that are detected by the piezo transducer 2 arranged within the load cell on the rear side of the membrane 9. The electronic system 6 and optionally the antenna 7 can be arranged together with the piezo transducer 7 in the load cell 8. The electronic system 6 and, if appropriate, the antenna 7 can, however, also be accommodated, for example, in a type of plug housing which can be plugged onto the pressure gauge 8.

Figure 3:
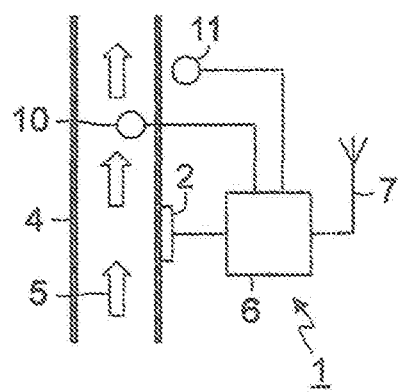
FIG. 3 is a schematic illustration of an exemplary embodiment of the flow meter in accordance with the invention in which the piezo transducer detects the pressure pulses on a fluid line.

FIG. 3 shows an exemplary embodiment of the flow meter 1 in accordance with the invention in which the piezo transducer 2 operates as a structure-borne sound sensor and is mounted on the outside of the fluid line 4, for example, as a clamp-on sensor. Here, the piezo transducer 2 detects the sound pulses generated by the pressure pulses in the wall of the fluid line 4. As FIG. 3 also shows, further sensors 10, 11 can be connected to the electronic system 6 in order to detect measurement variables, such as pressure and/or temperature, relevant to the flow of the fluid 5 and to make it possible to correct the flow value determined from the structure-borne sound based on these measured variables. Such further sensors can also be provided in the examples of FIGS. 1 and 2.

Figure 4:
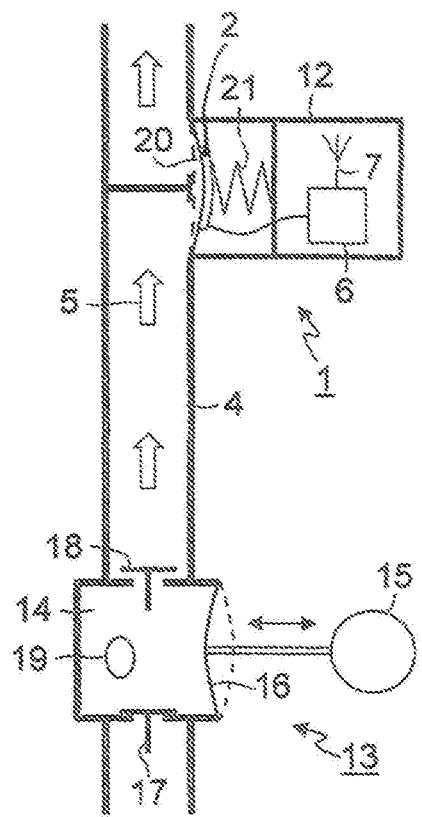
FIG. 4 is a schematic illustration of an exemplary embodiment of the flow meter in accordance with the invention in which the piezo transducer is a component of a pressure-sustaining valve.

FIG. 4 finally shows an exemplary embodiment of the flow meter 1 in accordance with the invention, in which the piezo transducer 2 is a component of a pressure-sustaining valve 12 or is installed in such a valve. Pressure-sustaining valves 12 are often used in conjunction with metering pumps to generate the counter-pressure necessary for the pumps. FIG. 4 shows such a metering pump 13, here in the form of a diaphragm metering pump. The latter has a working chamber 14 that is alternately enlarged and reduced by a metering diaphragm 16 that is deflected by a drive 15. During the suction stroke of the metering diaphragm 16, a defined volume of the fluid 5 is sucked into the working chamber 14 via an intake valve 17 and, during the pressure stroke, is pressed via a pressure valve 18 into the fluid line (pressure line or metering line) 4 to a consumption point. The metering diaphragm 16 can be driven in different ways, for example, via an electromagnet, a motor, compressed air (pneumatically) or hydraulically, where the pump or metering power or the delivery flow or flow rate is adjustable and variable over the stroke frequency and/or stroke length. Due to the elasticity of the metering diaphragm 16, however, the flow rate is also dependent on the counter-pressure in the metering line 4. If the fluid 15 contains gas bubbles 19, they are compressed at each pressure stroke so that the flow is reduced.

The pressure-sustaining valve 12 has a closing body 20 in the form of a valve diaphragm that is moved from the closed position against the force of a spring 21 when the pressure of the fluid 5 in the pressure line 4 coming from the pump 13 exceeds a predetermined value. When the pressure-sustaining valve 12 is open, the flow of the fluid 5 is proportional to the valve stroke of the valve diaphragm 20. When the pressure-sustaining valve 12 is closed, the fluid 5 does not flow. The valve stroke and the opening duration of the pressure-sustaining valve 12 therefore represent exactly the metering quantity of the fluid 5 for each pump stroke of the metering pump 13. The piezo transducer 2 is arranged on the rear side of the valve diaphragm 20 facing away from the fluid 5 and detects the deflection or deformation thereof. It is thus possible, with the aid of the piezo transducer 12, to detect the metering quantity of the fluid 5 at each pump stroke and thus the flow of the fluid 5 with a high degree of accuracy. No correction of the flow measurement performed via the piezo transducer 2 is then necessary, so that the further sensors 10, 11 shown in FIG. 3 are not required. As FIG. 4 shows, the flow meter 1 together with the electronic system 6 and optionally the antenna 7 can be integrated in the pressure-sustaining valve 12 or installed in its housing. It should be understood the electronic system 6 and/or antenna 7 can also be accommodated in a plug housing that is held on the pressure-sustaining valve 12 via an interface.

Figure 5:
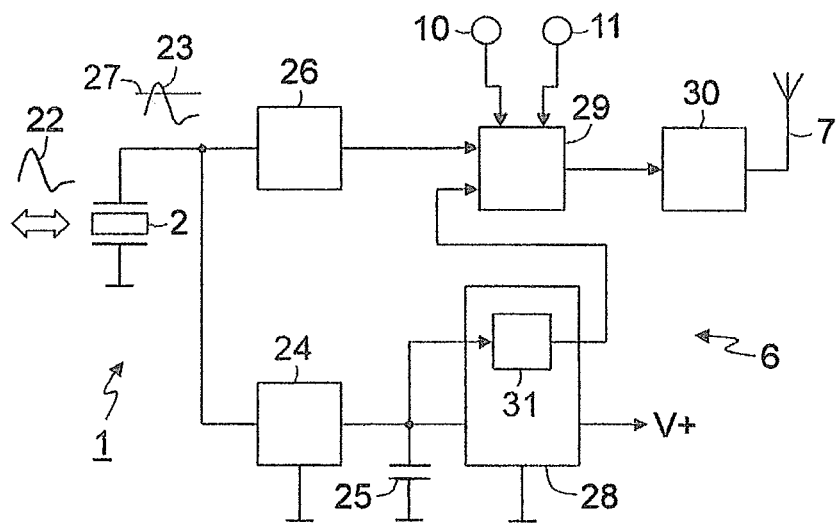
FIG. 5 is a first schematic block diagram of the flow meter in accordance with the invention.

FIG. 5 shows a schematic block diagram of the flow meter in accordance with the invention with the piezo transducer 2, the electronic system 6 and the antenna 7. The piezo transducer 2 converts the fluid pulses 22 that it detects into electrical pulses 23. The electrical pulses 23 are cumulatively stored in an energy store 25, which here consists of a capacitor, by an AC/DC converter circuit 24 known per se, such as a rectifier with a downstream DC/DC switching converter. At the same time, each electrical pulse 23 is counted by a counter 26 when the pulse 23 exceeds a threshold value 27, for example. The counting of the electrical pulses 23 occurs in a time interval that is either predefined or up to a predefined counter reading, where the time interval is then variable. The energy requirement of the counter 26 and the AC/DC converter circuit 24 is very low because of their simple functions, so that they are permanently active, where they are supplied via a power supply device 28 from the energy stored in the capacitor 25. The energy consumption is substantially lower than the energy supply due to the cumulative storage of the pulses 23.

The power supply device 28 generates a supply voltage V+(or possibly a plurality of supply voltages) and is also used for supplying power to an evaluation device 29 for determining the flow value and to a communication device 30 for the wireless transmission of the determined flow value via the antenna 7. However, the evaluation device 29 and the communication device 30 are deactivated as long as the predetermined counter reading is not reached and, on the other hand, the energy available in the energy store 25 is not sufficient. The power supply device 28 contains a measuring device 31 that monitors the voltage across the capacitor 25 and prevents activation of the evaluation device 29 and the communication device 30 or deactivates both devices 29, 30 as long as the voltage falls below a predetermined threshold value.

At the end of the predetermined time interval, for example, the counter 26 attempts to transmit the counter reading reached into the evaluation device 29 and to activate the latter. This attempt is prevented by the measuring device 31 when the voltage across the capacitor 25 is below the predetermined threshold value. Here, a new time interval for counting the pulses 23 is started until, at the end of the time interval, the energy accumulated in the energy store is sufficient to operate the evaluation device 29 and the communication device 30. The evaluation device 29 then determines a flow value based on the counter reading and an impulse parameter indicative of the flow, which is transmitted by the communication device 30 via the antenna 7 if there is sufficient energy in the energy store 25.

In the example shown, the energy accumulated within the time interval in the energy store or capacitor 25 is used as the flow-relevant pulse parameter. Here, the increase in energy corresponds to the difference of the voltages across the capacitor 25 determined by the measuring device 31 at the beginning and end of the time interval. As already mentioned above, the capacitor can be recharged, for example, via a DC-DC converter, into a rechargeable battery or another energy store. If this is performed before the start of each new time interval for counting the pulses, the capacitor can be placed in the same defined charge state at the beginning of each time interval, so that a voltage measurement is only required at the end of the time interval.

The further sensors 10, 11 (FIG. 3) can be connected to the evaluation device 29 in order to detect measurement variables, such as pressure and/or temperature, relevant to the flow of the fluid 5 and to make it possible to correct the flow value determined on the basis of these measured variables.

Figure 6:
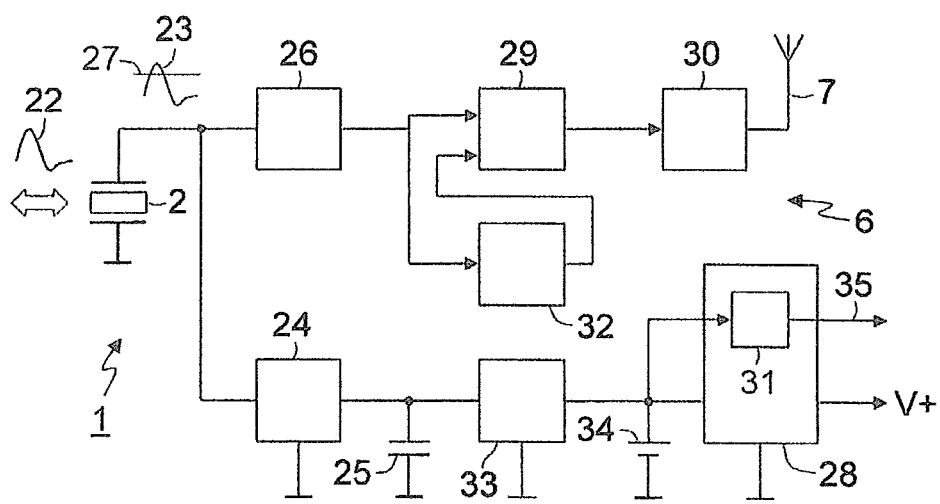
FIG. 6 is a further schematic block diagram of the flow meter in accordance with the invention.

FIG. 6 shows, by way of example, a schematic block diagram of the flow meter 1 in accordance with the invention for the use shown in FIG. 4 in a pressure-sustaining valve 12. As already mentioned, the valve stroke and the opening duration of the pressure-sustaining valve 12 (or solely the opening duration at a constant maximum valve stroke) exactly reflect the dosing quantity of the fluid. A measuring device 32, which is assigned to the evaluation device 29 or is a component thereof, measures the duration and, if appropriate, the height of individual electrical pulses 23 as a measure of the opening duration and, if appropriate, the valve lift of the pressure-sustaining valve 12. The evaluation device 29 calculates the current flow value of the fluid 5 therefrom and from the counter reading obtained from the counter 26.

In the example shown, the capacitor 25 is recharged into a rechargeable battery 34 via a DC-DC converter 33. The DC-DC converter and battery 34 shown here as separate components may be components of the power supply device 28, which generates the supply voltage V+ for the electronic system 6. The measuring device 31 deactivates the evaluation device 29 and communication device 30 via its output 35 or prevents the activation thereof as long as the energy reserve contained in the battery 34 is below a threshold value.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A flow meter for measuring a fluid having an induced pulsating flow, the flow meter being configured to connect to a fluid line through which said fluid having the induced pulsating flow moves, the flow meter comprising:
a piezo transducer which senses, in a first phase, a flow rate of the fluid having the induced pulsating flow and which generates power which is supplied to the flow meter, said piezo transducer receiving and converting fluid pulses into electrical pulses in the first phase, and said flow meter being exclusively supplied with power generated by the piezo transducer;
   an AC/DC converter circuit which cumulatively stores pulse energies of individual pulses of the electrical pulses in an energy store in the first phase;
   a counter which simultaneously counts the electrical pulses generated by the piezo transducer in the first phase during a time interval;
   of the counted electrical pulses in a second phase, said evaluation device only being active and supplied with stored energy from the energy store in the second phase, and said pulse parameter being indicative of an amount of fluid flowing in a fluid line, and which calculates a flow value of the fluid in the second phase based on (i) the electrical pulses counted within the time interval and (ii) the determined pulse parameter indicative of a flow rate of at least one of the electrical pulses, the second phase occurring subsequent to the first phase;
   a communication device which sends the determined flow value, said communication device only being active with the evaluation device and supplied with the stored energy from the energy store in the second phase; and
   a power supply device which exclusively supplies power to the flow meter based on the pulse energies of the electrical pulses cumulatively stored in the energy store.

2. The flow meter as claimed in claim 1, wherein in order to determine the flow-relevant pulse parameter the evaluation device detects an energy input of the at least one electrical pulse into the energy store as energy accumulated in the energy store within the time interval.

3. The flow meter as claimed in claim 1, wherein the evaluation device detects at least one of (i) a duration, (ii) height and (iii) surface of the at least one electrical pulse as flow-relevant pulse parameters.

4. The flow meter as claimed in claim 1, further comprising:
   at least one sensor which detects a measured variable relevant to the flow of the fluid;
   wherein the evaluation device is configured to correct the determined flow value based on the measured variable.

5. The flow meter as claimed in claim 4, wherein the at least one sensor comprises at least one of (i) a temperature sensor and (ii) a pressure sensor.

6. The flow meter as claimed in claim 1, wherein the counter is configured to activate the evaluation device when a predetermined counter reading is reached.

7. The flow meter as claimed in claim 1, wherein the power supply device includes a measuring device which measures the energy contained in the energy store and which is configured to deactivate at least one of (i) the evaluation device and (ii) the communication device as long as the stored energy falls below a predetermined threshold value.

8. The flow meter as claimed in claim 1, wherein the communication device is configured to wirelessly transmit the determined flow value.

9. The flow meter as claimed in claim 1, wherein the piezo transducer is connected to a closing body of a pressure valve.

10. The flow meter as claimed in claim 9, wherein the evaluation device is further configured to determine an opening amount of the closing body as a pulse parameter based on a duration of the at least one electrical pulse.

11. The flow meter as claimed in claim 10, wherein the evaluation device is further configured to determine an opening stroke of the closing body as a further pulse parameter based on a height of the at least one electrical pulse and additionally to utilized said pulse parameter to determine the flow value.

* * * * *